Nov. 16, 1937.      C. USBECK      2,099,286
PASTE CUTTING ROLLER
Filed Nov. 1, 1935      2 Sheets-Sheet 1
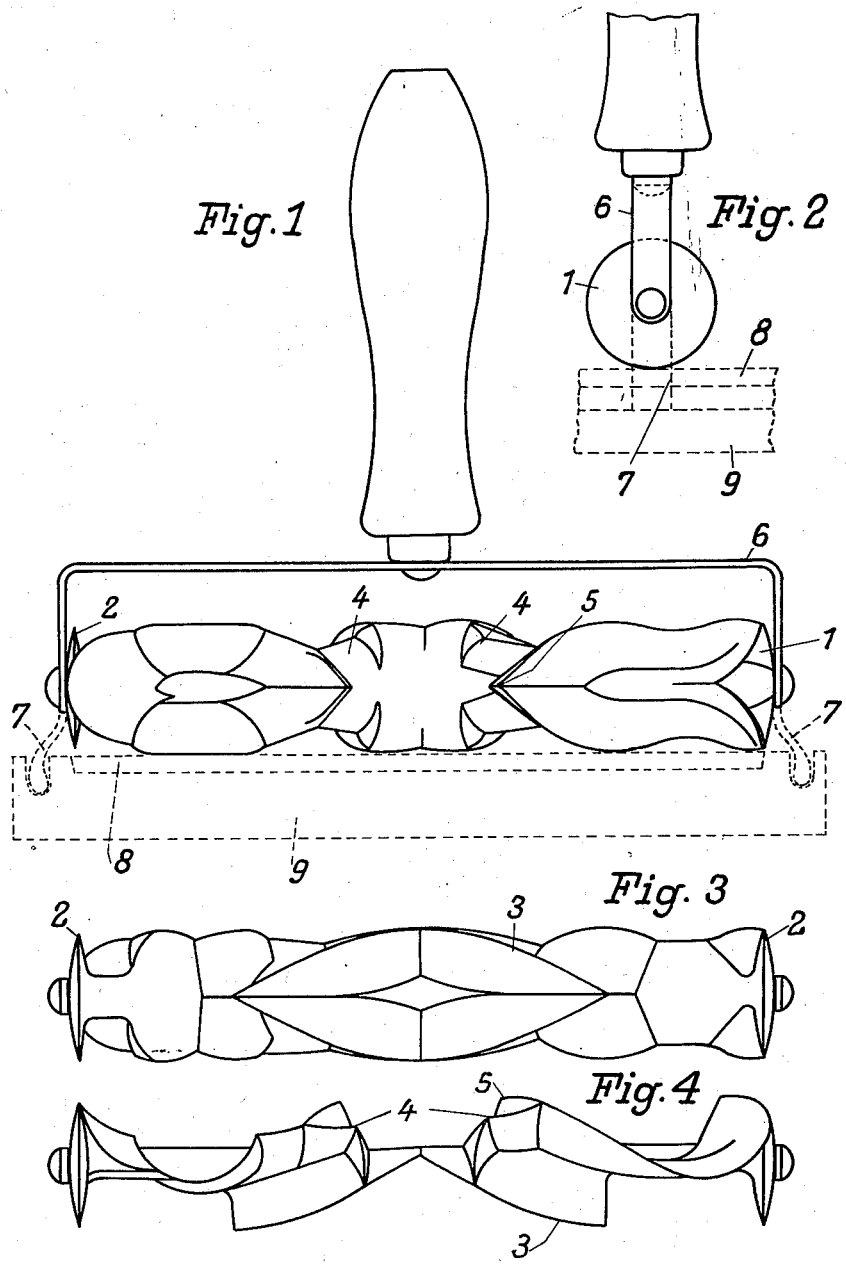

Nov. 16, 1937.  C. USBECK  2,099,286
PASTE CUTTING ROLLER
Filed Nov. 1, 1935   2 Sheets-Sheet 2

Inventor:

Patented Nov. 16, 1937

2,099,286

UNITED STATES PATENT OFFICE 2,099,286

PASTE CUTTING ROLLER

Christian Usbeck, Steinbach-Hallenberg, Germany

Application November 1, 1935, Serial No. 47,818
In Germany November 7, 1934

1 Claim. (Cl. 30—306)

This invention relates to a paste cutting roller.

Paste cutters are known both in the form of a shaped tool and of a roller.

With the former the pieces of paste are cut to shape from the rolled out dough by pressing the cutter thereon whereas the roller is rolled over the dough to produce the shaped pieces.

Both methods are open to objections. The cutting out with the aid of tools is tiring, tedious and takes considerable time, and there is often waste. The first three objections are partly overcome by employing the known roller. This, however, does not overcome the objection of waste, seeing that with the known roller cutters there are gaps between the tools mounted thereon and incisions and cut out portions at the ends of the roller, according to the shapes, resulting in a considerable amount of waste. This waste of material must be repeatedly rekneaded and again rolled out until it is entirely used up. This, however, detrimentally affects the quality of the paste. It becomes harder than that paste which has only been rolled once, which is shorter.

These objections are overcome by the invention in that the axle of a roller carries at each end a circular knife and further known rib-like blades forming cutter moulds of any desired shape without intermediate gaps. The advantage is thus derived that, when the cutting roller according to the invention is used, strips of uniform width having straight edges are cut out of the rolled paste and at the same time divided into pieces of different shapes without any waste.

The paste cutting roller is preferably rotatably mounted in the short bent over arms of a frame provided with a handle. The free end of one or both of the arms of the frame is constructed to form abutment-like guides. These guides enable the roller to be guided absolutely straight when in use. According to the invention band-shaped strippers may be arranged on the frame to prevent the pieces cut out by the cutters from adhereing to the roller.

An embodiment of the invention is illustrated in the accompanying drawings, in which:—

Fig. 1 shows in elevation a paste cutting roller mounted in a frame with abutment-like guides, indicated in dotted lines, engaging in grooves in the paste board.

Fig. 2 is an end view of Fig. 1.

Fig. 3 shows in elevation the roller turned through 180° relatively to Fig. 1.

Fig. 4 is a similar view showing the roller rotated through 90° relatively to Fig. 3.

Figure 5:
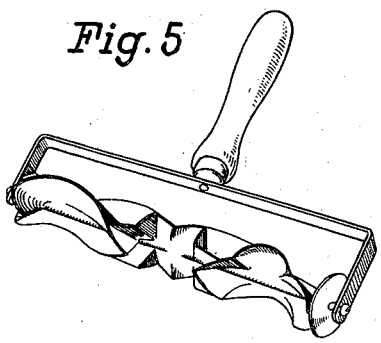
Fig. 5 shows the cutter roller in perspective view on a reduced scale.
Figure 6:
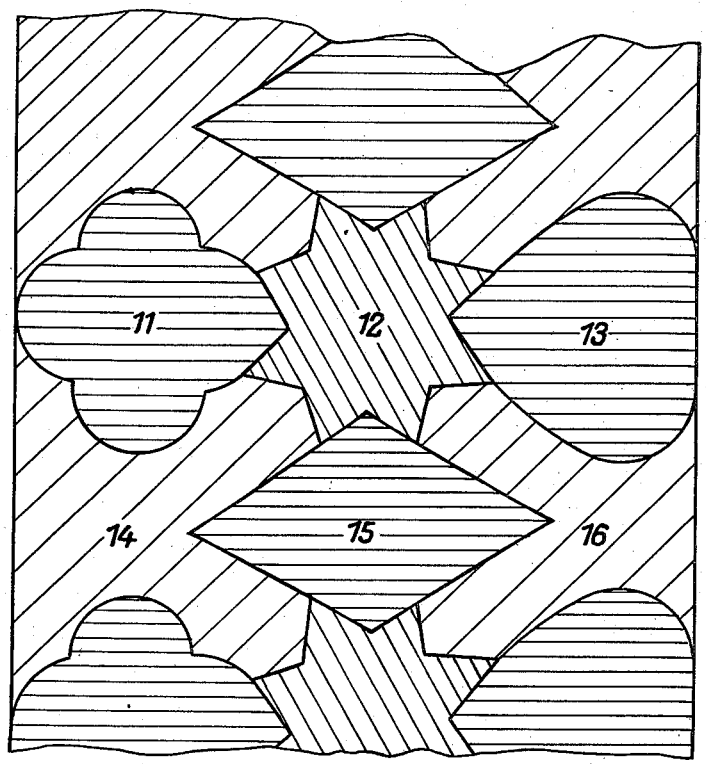
Fig. 6 shows the development of cutter molds arranged on the roller.

About the axle 1 of a paste cutting roller bordered at its ends by circular knives 2, known rib-like blades 3, 4, and 5 are arranged in such a manner that shapable cutting moulds are formed in any sequence directly side by side but otherwise of any shape, without any intervening gaps, as illustrated in Fig. 6. The paste cutting roller 1 is loosely rotatable in a frame 6, the free ends 7 of the arms of which are shaped to form abutment-like guides designed to engage in grooves or over the outer edge of a paste board 9 and enable the roller 1 to be guided absolutely straight when in use. The recess 8 provided in the paste board 9 indicates the layer of paste to be rolled therein. Fig. 6 shows a possible arrangement of the cutter moulds 11 to 16 on the axle 1, and which are produced in continuous succession when the roller is rotated.

I claim:—

A paste cutting roller for cutting paste shapes without intervening spaces, comprising in combination a bow-shaped frame handle, a solid body loosely mounted in said handle, said solid body composed of an axial core, circular knives one at each end of said core, and cutter blades of irregular shape projecting from said axial core and extending one into the other along the entire length of the roller between said circular knives.

CHRISTIAN USBECK.